US005315403A

United States Patent [19]
Hirai et al.

[11] Patent Number: 5,315,403
[45] Date of Patent: May 24, 1994

[54] FACSIMILE APPARATUS IN WHICH INPUT TO MEMORY IS CONTROLLED BASED UPON CAPACITY OF EXTERNAL STORAGE DEVICE

[75] Inventors: Nobuyuki Hirai; Masato Hara, both of Yokohama, Japan

[73] Assignee: Canon Kabushiki Kaisha, Tokyo, Japan

[21] Appl. No.: 853,445

[22] Filed: Mar. 18, 1992

[30] Foreign Application Priority Data

Mar. 22, 1991 [JP] Japan ................................. 3-058459

[51] Int. Cl.⁵ ............................................. H04N 1/00
[52] U.S. Cl. ................................... 358/404; 358/444; 395/425
[58] Field of Search ............... 358/404, 468, 403, 402, 358/444, 442, 434, 436, 437, 438; 355/202, 203, 204, 205; 395/425, 600

[56] References Cited

U.S. PATENT DOCUMENTS

| | | | |
|---|---|---|---|
| 4,330,825 | 5/1982 | Girard | 395/325 |
| 4,506,342 | 3/1985 | Yamamoto | 358/403 |
| 4,719,514 | 1/1988 | Kurahayashi | 358/404 |
| 4,827,349 | 5/1989 | Ogata et al. | 358/468 |
| 4,900,902 | 2/1990 | Sakakibara | 358/442 |
| 4,967,288 | 10/1990 | Mizutori et al. | 358/404 |
| 4,975,783 | 12/1990 | Takaoka | 358/404 |
| 5,105,284 | 4/1992 | Sakata et al. | 358/404 |
| 5,163,088 | 11/1992 | LoCasio | 358/468 |
| 5,184,178 | 2/1993 | Takayanagi et al. | 355/202 |

FOREIGN PATENT DOCUMENTS

| | | | |
|---|---|---|---|
| 0093877 | 5/1985 | Japan | 358/404 |
| 0112370 | 6/1985 | Japan | 358/404 |
| 0183874 | 9/1985 | Japan | 358/404 |

*Primary Examiner*—Mark R. Powell
*Assistant Examiner*—Fan Lee
*Attorney, Agent, or Firm*—Fitzpatrick, Cella, Harper & Scinto

[57] ABSTRACT

When image information is received, a main controller investigates the blank memory capacity of a floppy disk, after which the main controller executes processing for storing the received image information in an image-information semiconductor memory while confirming that sufficient blank memory remains in the image-information memory. If, during execution of the processing for storing the image information, the blank memory area of the image-information memory runs out so that no further image information can be stored there, or the quantity of image information to be stored in the image-information memory becomes greater than the blank memory capacity of the floppy disk, an error warning is issued, the processing for storing the image information is suspended and processing for interrupting communication is executed.

15 Claims, 5 Drawing Sheets

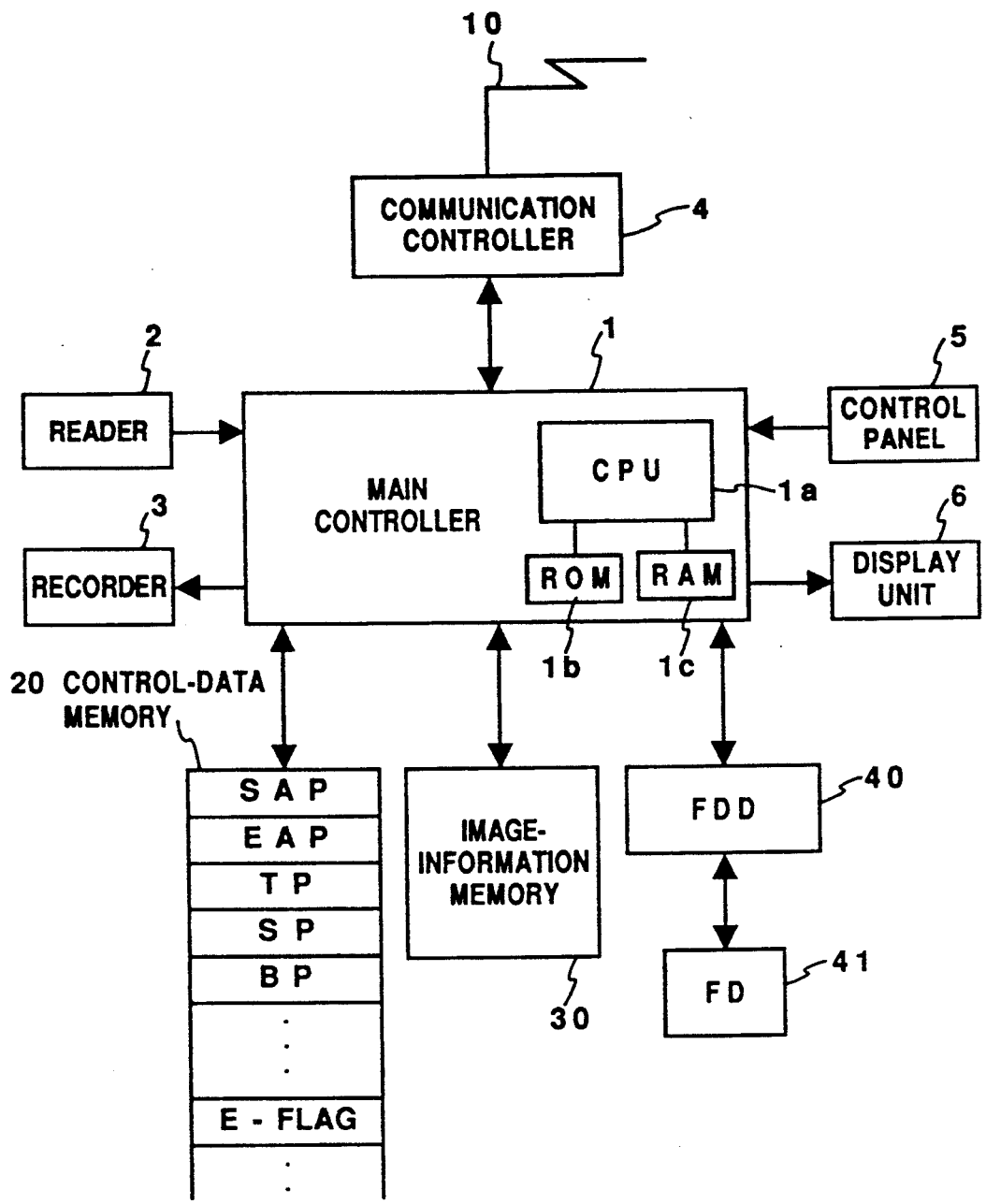
F I G. 1

FACSIMILE APPARATUS IN WHICH INPUT TO MEMORY IS CONTROLLED BASED UPON CAPACITY OF EXTERNAL STORAGE DEVICE

BACKGROUND OF THE INVENTION

1. Field of the Invention

This invention relates to a facsimile apparatus in which received image information is temporarily stored in a storage medium having a high storage speed, and the image information that has been stored in the storage medium having the high storage speed is transferred to and stored in a storage medium having a low storage speed.

2. Description of the Prior Art

In a conventional facsimile apparatus, it is known to use a semiconductor as a storage medium for storing image information. Recently, hard disks and floppy disks, which are non-volatile storage media, have come to be used as the storage media in facsimile apparatus.

A facsimile apparatus which uses a non-volatile storage medium having a low storage speed, such as a floppy disk, is constructed as follows so as not to lower the processing speed of the overall apparatus: Received image information is temporarily stored in a storage medium (hereinafter referred to as a "first storage medium") having a high storage speed, the image information that has been stored in the first storage medium is transferred to a storage medium (hereinafter referred to as a "second storage medium") having a low storage speed, and the transferred image information is stored in the second storage medium.

However, in the conventional facsimile apparatus described above, there are occasions where some or a major part of the image information received by a single communication is not stored in the second storage medium. The reason for this is that blank memory in the second storage medium is used up during the transfer of the image information from the first storage medium to the second storage medium, and therefore all of the image information stored in the first storage medium cannot be stored in the second storage medium.

Further, it is necessary for the first storage medium to store the received image information in succession. As a consequence, if blank memory in the first storage medium is used up, the image information that has already been stored in the first storage medium is successively deleted starting with the oldest information in order to produce blank memory, and newly received image information is stored in this blank memory. Consequently, image information that should be received not only is not stored in the second storage medium but also is not stored in the first storage medium.

SUMMARY OF THE INVENTION

An object of the present invention is to provide a facsimile apparatus which solves the aforementioned problems.

In the facsimile apparatus of the present invention, the blank memory capacity of a second storage medium is detected when reception of image information starts. While the received image information is being written in a first storage medium, the blank memory capacity of the second storage medium and the quantity of image information stored in the first storage medium are compared. When the quantity of image information stored in the first storage medium becomes greater than the blank memory capacity of the second storage medium, the reception of the image information is suspended. As a result, if there is no longer sufficient blank memory capacity in the second storage medium, the image information is not received. This solves the aforementioned problem in which image information that should be received not only is not stored in the second storage medium but also is not stored in the first storage medium.

According to the present invention, the foregoing object is attained by providing a facsimile apparatus comprising first storage means for storing received data, transfer means for reading out data stored in the first storage means, transferring this data to and storing it in second storage means, detecting means for detecting blank memory capacity of the second storage means, and control means for controlling the storage operation of the first storage means and the transfer operation of the transfer means based upon the blank memory capacity detected by the detecting means.

In the facsimile apparatus constructed as described above, the blank memory capacity of a second storage medium is detected when reception of image information starts. The received image information is stored in a first storage medium, during which time the blank memory capacity of the second storage medium and the quantity of image information stored in the first storage medium are compared. When the quantity of image information stored in the first storage medium becomes greater than the blank memory capacity of the second storage medium, the reception of the image information is suspended. As a result, if there is no longer sufficient blank memory capacity in the second storage medium, the image information is not received.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a block diagram illustrating a first embodiment of a facsimile apparatus according to the present invention;

DESCRIPTION OF THE PREFERRED EMBODIMENT

Figure 2:
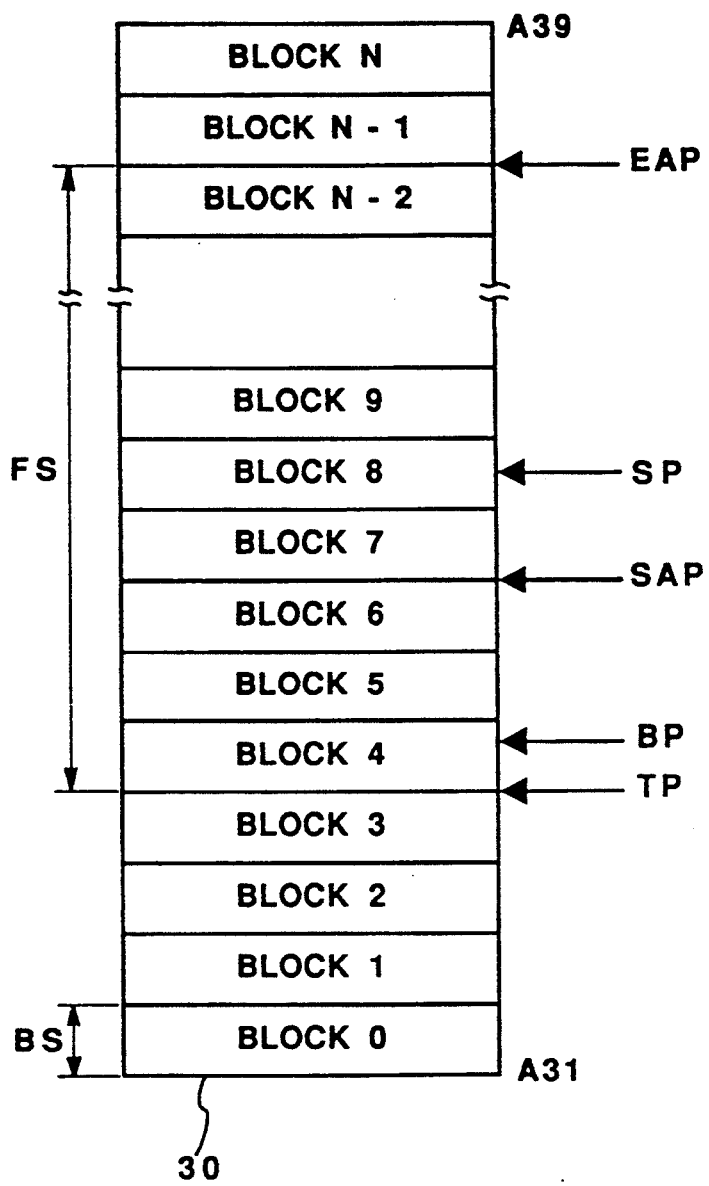
FIG. 2 is a diagram showing an example of the relationship between the arrangement of an image-information memory and pointers according to this embodiment.

An embodiment according to the present invention will now be described in detail with reference to the drawings.

FIG. 1 is a block diagram illustrating a facsimile apparatus according to an embodiment of the present invention.

As shown in FIG. 1, the apparatus includes a main controller 1 comprising a single-chip microcomputer which includes a CPU 1a, a ROM 1b for a program memory, and a RAM 1c for a working memory. The main controller 1 administers overall control of the embodiment in accordance with a control program stored in the ROM 1b and illustrated in FIG. 3. Connected to the main controller 1 are a reader 2 comprising an image scanner or the like, which includes a CCD image sensor, an original-document conveyance mechanism, etc., a recorder 3 constituted by a thermal printer, an ink-jet printer or a laser-beam printer, by way of example, a communication controller 4 comprising a MODEM, a network control unit NCU, etc., a control panel 5 comprising a keyboard and the like, or a display unit 6 comprising an LCD or the like. A line 10 is connected at one end to the communication controller 4 and at its other end to another facsimile apparatus or the like via a public telephone network, etc. A control-data memory 20 comprises a RAM or the like for storing various types of control data, described below, and an image-information memory 30 comprises a RAM or the like for temporarily storing image information to be transmitted, or image information that has been received, under the control of the main controller 1. The image-information 30, which is constituted by a RAM or the like, is one example of a storage medium having a high storage speed. Also connected to the main controller 1 is a floppy-disk drive (hereinafter referred to as an "FDD") 40 for loading a floppy disk (hereinafter referred to as an "FD") 41 loaded and unloaded at will. The FD 41 functions as an external storage device in this embodiment and is one example of a storage medium having a low storage speed.

The image-information memory 30 has a memory area which is partitioned into a plurality of memory blocks in storage units of the same size as that of the FD 41, e.g., in units 512 bytes. The stored image information is transferred, in block form, to the FD 41 every memory cycle by the main controller 1.

The control-data memory 20 includes a starting-address pointer SAP which points out an address of the image-information memory 30. The main controller 1 stores image information, which has arrived from the communication controller 4, in the image-information memory 30 from the address designated by the pointer SAP toward a higher-order address. At the end of storage of the image information, the address value of the beginning of the memory block following the last memory block in which the above-mentioned image information has been stored is stored in the starting-address pointer SAP by the main controller 1. In other words, the starting-address pointer SAP always points toward the starting address of the starting memory block of the image-information memory at which the storage of the image information is to begin.

In addition to having the starting-address pointer SAP, the control-data memory 20 includes an end-address pointer EAP, a transfer pointer TP, a storage pointer SP, a block pointer BP, and an error flag E-FLAG, etc.

The most significant address of the image-information memory 30 at which image information is capable of being stored in the FD 41 currently loaded in the FDD 40 is stored in the end-address pointer EAP by the main controller 1. In other words, if a memory block of the image-information memory 30 is transferred to the FD 41, which is currently loaded in the FDD 40, beyond the address designated by the end-address pointer EAP, the blank memory of FD 41 will run out and, as a result, an image-information storage error will be generated.

The transfer pointer TP points to the beginning address of a memory block group in the process of being transferred, or awaiting such transfer, from the image-information memory 30 to the FD 41. At the end of transfer of the memory block group, the beginning address of the least significant blank memory block is stored in the transfer pointer TP.

The storage pointer SP, which is an address pointer used during image-information storage processing by the main controller 1, points to the address of the image-information memory 30 at which the processing for storing image information is in progress.

The block pointer BP, which is an address pointer used during image-information transfer processing by the main controller 1, points to the address of the image-information memory 30, at which the processing for transferring image information is in progress, by an offset address from the transfer pointer TP.

The error flag E-FLAG is set/reset by the main controller 1. The flag is set when processing for storing image information ends in an error, and is reset by the main controller 1 when error processing by the main controller 1 ends.

FIG. 2 is a diagram showing an example of the relationship between the arrangement of the image-information memory 30 and the address pointers. The image-information memory 30 shown in FIG. 2 includes blocks 0 to 3 for which the transfer of image information to the FD 41 has already been completed, a block 4 from which image information is currently being transferred to the FD 41, blocks 5 and 6 for which storage of image information has been completed, blocks 7 and 8 for which image information is currently being stored, and blocks 9 to N, which are blank memory blocks. Blank memory size FS of FD41 is equal to the memory size of blocks 4 to N−2. In FIG. 2, BS represents the memory block size of the image-information memory 30, A31 the least significant address of the image-information memory 30, and A39 the most significant address of the image-information memory 30. In the description and drawings to follow, the beginning address of the least significant blank memory block of the image-information memory 30 is represented by A35.

The flow of processing for storing and transferring image information according to this embodiment will now be described.

Figure 3:
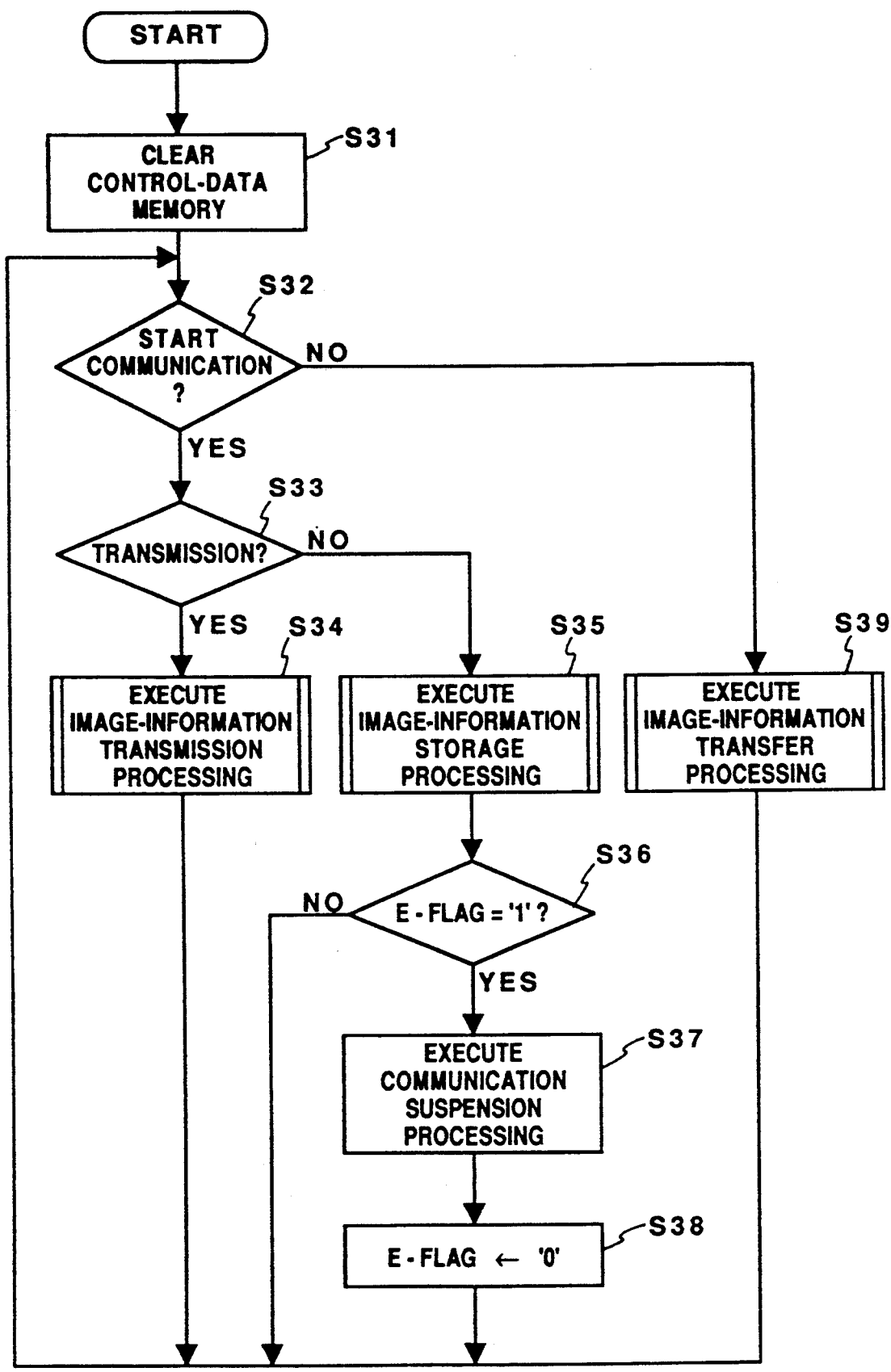
FIG. 3 is a flowchart for describing the flow of processing according to this embodiment.

FIG. 3 is a flowchart for describing the flow of processing performed by the main controller 1. In particular, special emphasis is given to processing relating to the storage and transfer of image information by the main controller 1.

When the power supply is turned on, the main controller 1 clears the control-data memory 20 and initializes the pointers and flag at step S31 in FIG. 3. Next, at step S32, the main controller 1 investigates the signal from the communication controller 4 and determines whether communication with another facsimile apparatus has started. If the main controller 1 has determined that communication with another facsimile apparatus has started, the program proceeds to step S33. Otherwise, the program proceeds to step S39.

The main controller 1 determines at step S33 whether the communication that has started is for transmission or reception of image information. The program proceeds to step S34 in case of transmission or to step S35 in case of reception.

Step S34 is processing which the main controller 1 executes to transmit image information. Since this is processing not directly related to the present invention, a detailed description thereof is omitted. When the main controller 1 finishes executing the processing of step S34, the program returns to step S32.

When it is determined at steps S32 and S33 that communication has started and that image information is to be received, the main controller 1 executes image-information storage processing, the details of which are described below, at step S35, and investigates the error flag E-FLAG at step S36. If the E-FLAG is found to be "1", the program proceeds to step S37, where communication-suspension processing is executed to suspend communication. This is followed by step S38, at which the E-FLAG is reset to "0". When the main controller 1 finishes the processing of step S36 or step S38, the program returns to step S32.

If it is found at step S32 that communication has not started, the main controller 1 executes image-information transfer processing, the details of which are described later, at step S39. When the processing of step S39 ends, the program returns to step S32.

In this embodiment, the main controller 1 repeatedly executes the processing from step S32 onward until the power supply is turned off.

The processing for storing image information according to this embodiment will now be described.

Figure 4:
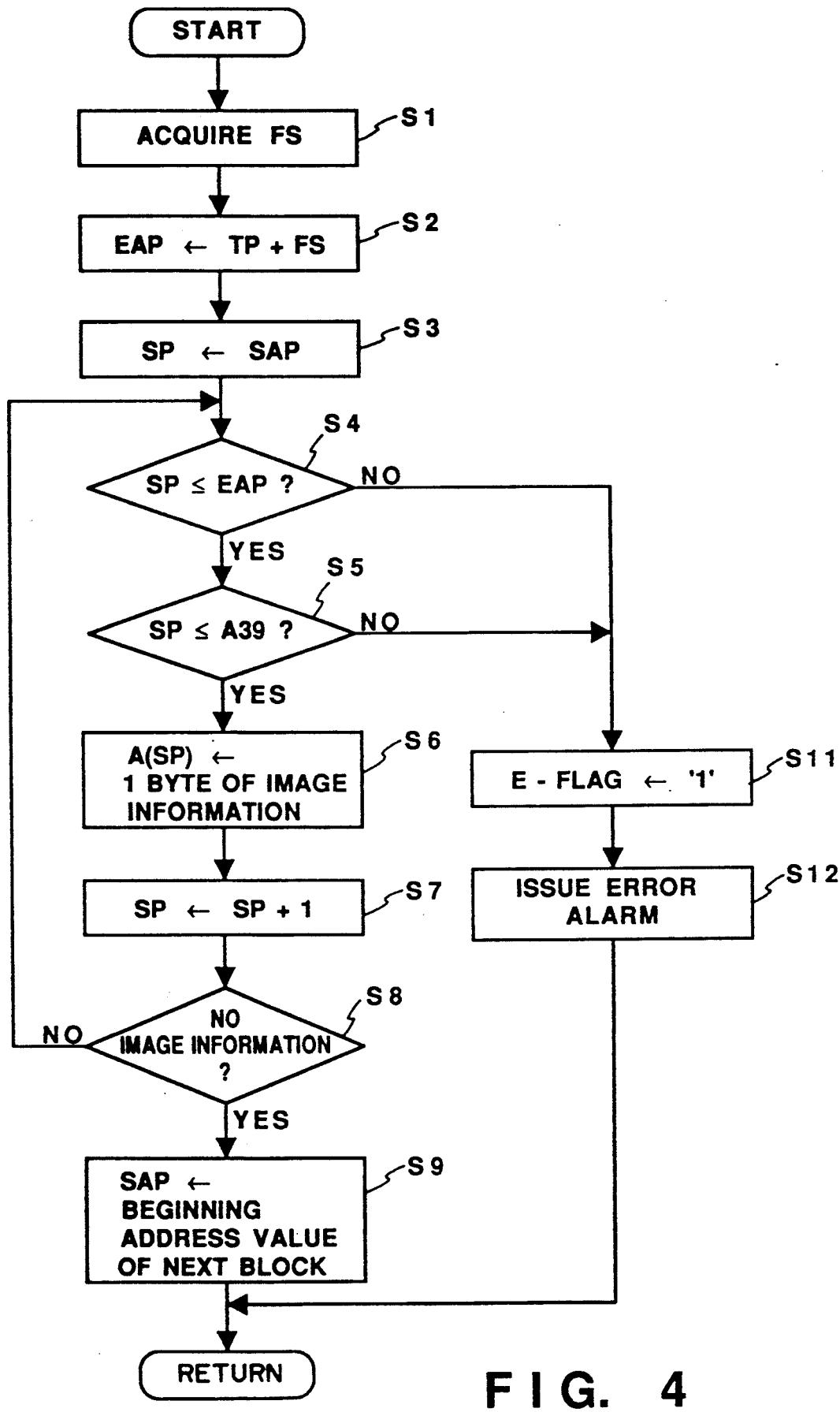
FIG. 4 is a flowchart illustrating processing for storing image information according to this embodiment.

FIG. 4 is a flowchart illustrating the processing executed by the main controller 1 to store image information. In the drawing and description to follow, $A_{(SAP)}$, by way of example, represents an address of the image-information memory 30 pointed to by the starting-address pointer SAP. The same is true for the other pointers as well.

At step S1 of FIG. 4, the main controller 1 acquires the memory size FS of the blank memory area in the currently loaded FD 41 via the FDD 40. If the FD 41 is a floppy disk formatted in the MS-DOS ® operating system, by way of example, the blank memory size FS of FD 41 can be acquired from a file allocation table FAT stored on the FD.

Next, at step S4, the main controller 1 compares the storage-address pointer SP and the end-address pointer EAP. It is confirmed through this processing that blank memory in the FD 41 will not run out if the image information to be stored from this point onward is transferred to the FD 41. In other words, if SP≦EAP holds, the main controller 1 judges that blank memory in the FD 41 will not run out, and the program proceeds to step S5. If SP>EAP holds, the main controller 1 judges that blank memory in the FD 41 will run out, and the program proceeds to step S11. At this step, the error flag E-FLAG is set to "1". Then, at step S12, an error warning is issued, after which the processing for storing the image information is terminated.

At step S5, the main controller 1 compares the storage address SP with the most significant address A39 of the image-information memory 30, thereby confirming that blank memory in the image-information memory 30 will not run out owing to the image information to be stored from this point onward. That is, the main controller 1 causes the program to proceed to step S6 if SP≦A39 holds and to step S11 if SP>A39 holds. At step S11, the error flag E-FLAG is set to "1". The error warning is then issued at step S12, after which the processing for storing the image information is terminated.

At step S6, the main controller 1 stores one byte of image information in the image-information 30 at an address $A_{(SP)}$ pointed to by the storage pointer SP. This is followed by step S7, at which the storage pointer SP is incremented, and then by step S8, at which it is determined whether there is still image information to be stored. The program returns to step S4 if there is still image information to be stored, or proceeds to step S9 if there is no further image information. In case of a G3 facsimile, for example, the determination as to whether or not there is image information to store is made by the main controller 1 based upon an EOP (end-of-procedures) signal contained in post-message commands in accordance with CCITT recommendation T.30. In other words, when the EOP signal is received, the main controller 1 judges that there is no longer any image information to be stored. Until the EOP signal is received, the main controller 1 judges that image information to be stored still remains.

At step S9, the main controller 1 stores, in the starting-address pointer SAP, the beginning address of the memory block that follows the memory block which includes the address pointed to by the storage pointer SP. As a result, processing for storing image information is terminated after the starting-address pointer SAP is updated.

More specifically, in the above-described processing for storing image information, the main controller 1 successively determines whether the transfer of image information to the FD 41 and the storage of image information in the image-information memory 30 are possible. If these are possible, then the storage of image information in the image-information memory 30 is continued; otherwise, the error flag E-FLAG is set and the storage of the image information is suspended. In the case where storage of the image information is suspended, the starting-address pointer SAP is not updated but maintains the same value that prevailed when processing for storing the image information started.

The error warning at step S12 is implemented as by displaying an error message on the display unit 6. However, the error-message display can be combined with a warning tone produced by a buzzer or the like.

Figure 5:
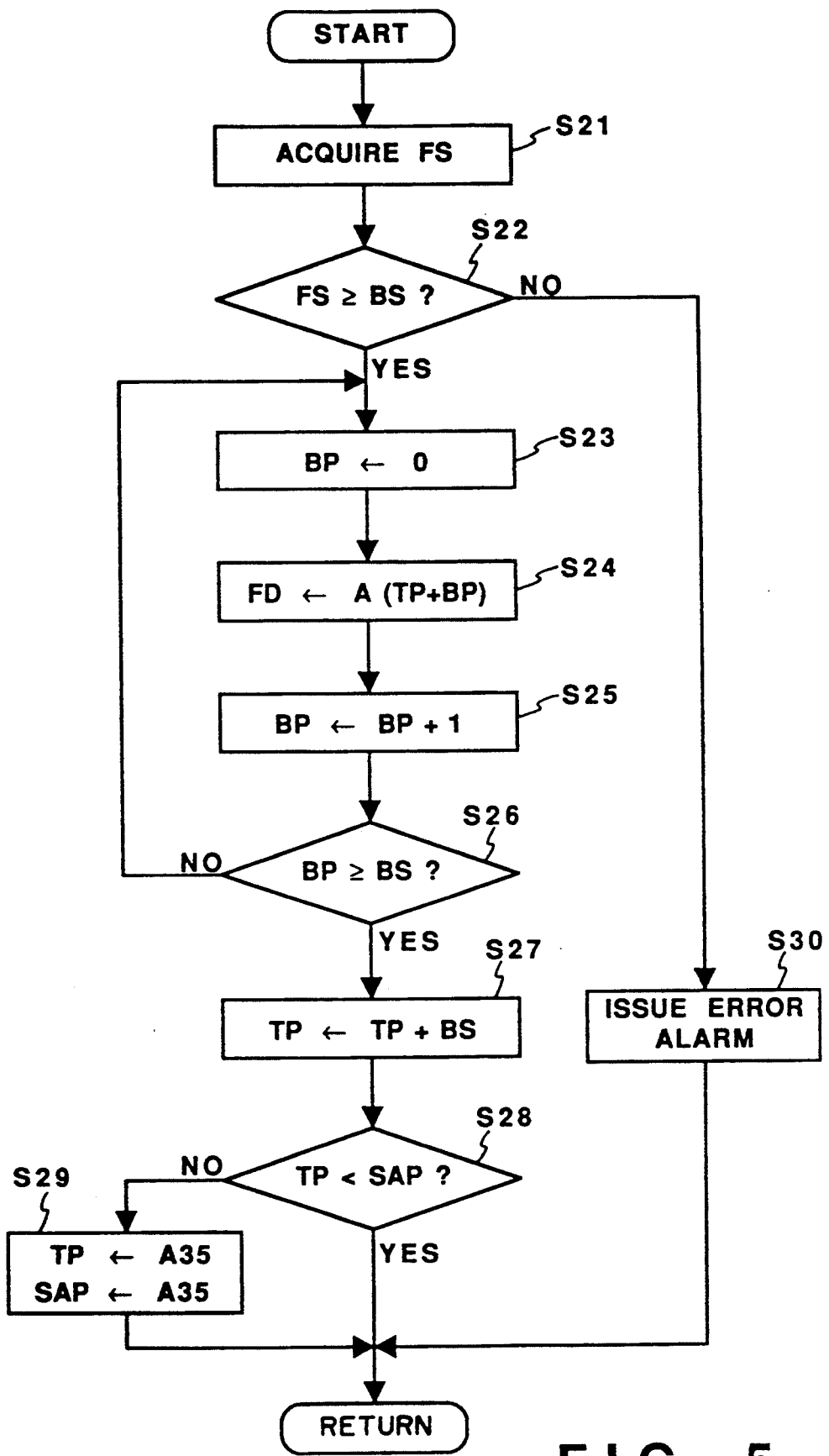
FIG. 5 is a flowchart illustrating processing for transferring image information according to this embodiment.

FIG. 5 is a flowchart illustrating processing which the main controller 1 executes to transfer image information.

At step S21 in FIG. 5, the main controller 1 acquires the memory size FS of the blank memory area in the currently loaded FD 41 via the FDD 40. If the FD 41 has been ejected from the FDD 40 when the processing of step S21 is executed, then, by way of example, the FDD 40 sends back a signal indicative of FS=0 to the main controller at step S21.

Next, at step S22, the main controller 1 compares the memory size FS obtained at step S21 with the memory block size BS, thereby confirming whether the blank memory area of the FD 41 is greater than the memory block size BS. In other words, the main controller 1 causes the program to proceed to step S23 if FS≧BS holds or to step S30 if FS<BS holds. An error warning is issued at step S30, after which the processing for transferring the image information is terminated. The error warning at step S30 is implemented as by displaying an error message on the display unit 6. However, the error-message display can be combined with a warning tone produced by a buzzer or the like.

Following step S22, the main controller 1 initializes the block pointer BP to 0 at step S23, transfers one byte of image information at address $A_{(TP+BP)}$ of the image-information memory 30 to FD 41 at step S24, and increments the block pointer BP at step S25. Then, at step S26, the main controller 1 compares the block pointer BP with the block size BS, thereby verifying whether the transfer of one memory block has ended or not. That is, the program causes the program to proceed to step S27 if BP≧BS holds or to return to step S24, where transfer of the image information is continued, if BP<BS holds.

The main controller 1 adds the memory block size BS to the value of the transfer pointer TP at step S27, thereby updating the transfer pointer TP, and compares the transfer pointer TP with the starting-address pointer SAP at step S28 If TP<SAP is found to hold at step S28, processing for transferring the image information is terminated. If TP≧SAP holds, the program proceeds to step S29. In other words, if TP≧SAP holds at step S28, the main controller 1 judges that all of the image information stored in the image-information memory 30 has been transferred to the FD 41, stores the beginning address A35 of the least significant blank memory block of the image-information memory 30 in the transfer pointer TP and starting-address pointer SAP, and terminates the image-information transfer processing after updating the transfer pointer TP and starting-address pointer SAP.

In the above description, and in FIG. 2, it is explained that the processing operation for storing image information and the processing operation for transferring image information are executed alternately by the main controller 1. However, if the main controller 1 used is capable of multi-task processing, then it will be possible for the image-information storage processing and the image-information transfer processing to be executed simultaneously.

In accordance with the present invention, as described above, the blank memory of the FD 41 does not run out during the transfer of image information from the image-information memory 30 (the first storage medium) to the FD 41 (the second storage medium). As a result, the image information stored in the image-information memory 30 is transferred to the FD 41 with assurance. This enhances the reliability of the facsimile apparatus and provides the user with a sense of security.

As many apparently widely different embodiments of the present invention can be made without departing from the spirit and scope thereof, it is to be understood that the invention is not limited to the specific embodiments thereof except as defined in the appended claims.

What is claimed is:

1. A facsimile apparatus comprising:
receiving means for receiving data;
first storage means for storing the received data;
second storage means for storing data;
transfer means for reading out data from said first storage means, and transferring the read out data to said second storage means;
detecting means for detecting a storage capacity of said second storage means; and
control means for controlling data storage to said first storage means by using the detected storage capacity of said second storage means as a storage capacity of said first storage means.

2. The apparatus according to claim 1, wherein said second storage means has a storage speed which is lower than a storage speed of said first storage means.

3. The apparatus according to claim 2, wherein said first storage means is a semiconductor memory.

4. The apparatus according to claim 3, wherein said second storage means ia n external storage device.

5. The apparatus according to claim 4, wherein a storage medium of said external storage device is capable of being freely loaded and unloaded for replacement.

6. The apparatus according to claim 1, wherein said control means includes a decision unit for deciding, based upon the storage capacity detected by said detecting means, whether said second storage means is usable;
wherein the data storage to said first storage means is allowed if said decision unit decides that said second storage means is usable; and
the data storage to said first storage means is inhibited if said decision unit decides that said second storage means is not usable.

7. The apparatus according to claim 6, further comprising an output unit for outputting information, which represents that said second storage means is not usable, if said decision unit decides that said second storage means is not usable.

8. The apparatus according to claim 7, wherein communication is suspended based upon information, outputted by said output unit, representing that said second storage means is not usable.

9. The apparatus according to claim 1, wherein said control means includes:
a detecting unit for detecting a storage capacity of said first storage means;
a second decision unit for deciding, based upon the storage capacity detected by said detecting unit, whether said first storage means is usable; and
a second output unit for outputting information, which represents that said first storage means is not usable, if said second decision unit decides that said first storage means is not usable.

10. The apparatus according to claim 9, wherein communication is suspended based upon information, outputted by said second output unit, representing that said first storage means is not usable.

11. A facsimile apparatus comprising:
receiving means for receiving data;
a semiconductor memory for storing the received data;
an external storage device for storing data;
transfer means for reading out data from said semiconductor memory, and transferring the read out data to said external storage device;
detecting means for detecting a storage capacity of said external storage device; and
control means for controlling data storage to said semiconductor memory by using the detected storage capacity of said external storage device as a storage capacity of said semiconductor memory.

12. The apparatus according to claim 11, wherein a storage medium of said external storage device is capable of being freely loaded and unloaded for replacement.

13. The apparatus according to claim 11, wherein said control means includes a decision unit for deciding, based upon the storage capacity detected by said detecting means, whether said external storage device is usable;

wherein the data storage to said semiconductor memory is allowed if said decision unit decides that said external storage device is usable; and wherein the data storage to said semiconductor memory is inhibited if said decision unit decides that said external storage device is not usable.

14. The apparatus according to claim 13, further comprising an output unit for outputting information, which represents that said external storage device is not usable, if said decision unit decides that said external storage device is not usable.

15. The apparatus according to claim 14, wherein communication is suspended based upon information, outputted by said output unit, representing that said external storage device is not usable.

* * * * *

UNITED STATES PATENT AND TRADEMARK OFFICE
CERTIFICATE OF CORRECTION

PATENT NO. : 5,315,403
DATED : May 24, 1994
INVENTOR(S) : NOBUYUKI HIRAI, ET AL.

It is certified that error appears in the above-identified patent and that said Letters Patent is hereby corrected as shown below:

<u>ON TITLE PAGE</u>

In [56] References Cited, under U.S. PATENT DOCUMENTS:
"LoCasio" should read --LoCascio--.

<u>COLUMN 8</u>

Line 7, "ia n" should read --is an--.

Signed and Sealed this

Twenty-ninth Day of November, 1994

Attest:

BRUCE LEHMAN

Attesting Officer         Commissioner of Patents and Trademarks